United States Patent
Polinger et al.

(10) Patent No.: US 12,321,767 B2
(45) Date of Patent: Jun. 3, 2025

(54) PROVIDING HOST MEDIA PROCESSING FUNCTIONALITY TO A GUEST OPERATING SYSTEM

(71) Applicant: MICROSOFT TECHNOLOGY LICENSING, LLC, Redmond, WA (US)

(72) Inventors: Anton Victor Polinger, Redmond, WA (US); Marcin Stankiewicz, Redmond, WA (US); Isuru Chamara Pathirana, Bellevue, WA (US); Kumar Rajeev, Redmond, WA (US); Isha Sharma, Bellevue, WA (US); Glenn Frederick Evans, Redmond, WA (US); Matthew R. Wozniak, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 399 days.

(21) Appl. No.: 17/958,106

(22) Filed: Sep. 30, 2022

(65) Prior Publication Data
US 2024/0111556 A1    Apr. 4, 2024

(51) Int. Cl.
G06F 9/54       (2006.01)
G06F 9/455      (2018.01)

(52) U.S. Cl.
CPC ...... *G06F 9/45545* (2013.01); *G06F 9/45558* (2013.01); *G06F 2009/45583* (2013.01); *G06F 2009/45587* (2013.01)

(58) Field of Classification Search
CPC .......... G06F 3/0662; G06F 9/54; G06F 9/541; G06F 9/542; G06F 9/544; G06F 9/45504;
(Continued)

(56) References Cited

U.S. PATENT DOCUMENTS 7,581,229 B2    8/2009  Watkins et al.
9,626,667 B2*   4/2017  Boccon-Gibod ....... H04L 63/10
(Continued)

FOREIGN PATENT DOCUMENTS

WO      2018119955 A1    7/2018

OTHER PUBLICATIONS

"android.media", Retrieved from: https://web.archive.org/web/20220707013217/https://developer.android.com/reference/android/media/package-summary, Jul. 7, 2022, 9 Pages.
(Continued)

*Primary Examiner* — Andy Ho
(74) *Attorney, Agent, or Firm* — Newport IP, LLC; Jacob P. Rohwer

(57) ABSTRACT

The techniques disclosed herein enable a guest operating system (OS) to access and use a media processing component configured on a host OS. The guest OS provides, via an API, a request to create an instance of the media processing component (e.g., a codec, an encryption/decryption component, a DRM component). In association with the request, the guest OS allocates space in memory for media data that is to be processed by the instance of the media processing component configured on the host OS. The guest OS stores the input media data in the allocated memory and provides, via the API, reference(s) to locations of the allocated memory. The reference(s) to the locations of the allocated memory enable the host OS to retrieve the input media data and process the input media data using the instance of the media processing component configured on the host OS.

20 Claims, 9 Drawing Sheets

(58) Field of Classification Search
CPC ............. G06F 9/45533; G06F 9/45541; G06F 9/45545; G06F 9/4555; G06F 9/45554; G06F 9/45558; G05B 2219/36037
See application file for complete search history.

(56) References Cited

U.S. PATENT DOCUMENTS

| | | |
|---|---|---|
| 10,802,861 B2 | 10/2020 | Noorshams |
| 2017/0161865 A1 | 6/2017 | Baudouin et al. |
| 2018/0035126 A1 | 2/2018 | Lee |
| 2018/0341529 A1* | 11/2018 | Kou .................. G06F 9/5077 |
| 2019/0116348 A1 | 4/2019 | Liu et al. |
| 2020/0401363 A1 | 12/2020 | Lee et al. |
| 2020/0409732 A1 | 12/2020 | Kovacevic |
| 2022/0012845 A1 | 1/2022 | Liu et al. |
| 2024/0394083 A1 | 11/2024 | Polinger |

OTHER PUBLICATIONS

"Android Code Search", Retrieved from: https://cs.android.com/android/platform/superproject/+/master:hardware/interfaces/media/omx/1.0/vts/functional/video/VtsHalMediaOmxV1_0TargetVideoDecTest.cpp?q=VtsHalMediaOmxV1_0TargetVideoDecTest, Retrieved Date: May 13, 2022, 26 Pages.

Notice of Allowance mailed on Mar. 13, 2025, in U.S. Appl. No. 18/324,492, 10 pages.

\* cited by examiner

PROVIDING HOST MEDIA PROCESSING FUNCTIONALITY TO A GUEST OPERATING SYSTEM

BACKGROUND

A computing device (e.g., a personal computer, a server in a datacenter) is a physical machine (may be referred to herein as "host" machine) configured with "host" components. The host components can be hardware, software, firmware, or a combination thereof. More specifically, a host component can include a host operating system and a hypervisor configured to create and/or execute virtual resources, such as a virtual machine or a container. A virtual machine can include a "guest" operating system. One example of this scenario where a host operating system and a hypervisor are configured to create and/or execute a guest operating system is the WINDOWS SUBSYSTEM FOR ANDROID (WSA).

The host operating system and the guest operating system typically include their own media processing components configured to perform media processing functions. In many scenarios, some of the media processing components included in the host operating system are different from some of the corresponding media processing components included in the guest operating system. For example, the host operating system includes a first type of codec while the guest operating system includes a second type of codec that is different than the first type of codec included in the host operating system.

The media processing components included in the host operating system are often more performant when compared to the different types of corresponding media processing components included in the guest operating system. This difference in performance between the media processing components included in the host operating system and corresponding media processing components included in the guest operating system may result in a noticeable effect for a user when the guest operating system is used in the gaming, streaming, and/or other media processing contexts. For instance, the playback of video via the guest operating system may be delayed and/or overload certain hardware resources (e.g., a central processing unit (CPU)) of the host machine, which can have a negative effect on the user experience.

SUMMARY

The disclosed techniques enable a guest operating system to access and use a media processing component configured on a host operating system. It can be beneficial for the guest operating system to access and use the media processing component configured on the host operating system if the media processing component configured on the host operating system is more performant than a corresponding, but different type of, media processing component configured on the guest operating system. Alternatively, it can be beneficial for the guest operating system to access and use the media processing component configured on the host operating system when the guest operating system does not have its own corresponding media processing component.

A media processing component is software, hardware, firmware, or a combination thereof, that is involved in performing an operation, or function, related to the processing of media data. The processing of the media data enables images and/or audio (e.g., game video, streaming video, photographs, music, podcasts, videoconference session) to be output via a display device and/or an audio output device (e.g., a speaker, ear phones). In one example, the operation related to the processing of the media data is encoding and/or decoding the media data. Accordingly, the media processing component can be a codec. A codec includes an encoder that compresses the media data and/or a decoder that decompresses the media data.

Provisioning access to, and use of, the codec of the host operating system is beneficial to a guest operating system when the codec of the host operating system provides an interface to hardware functionality, while the codec of the guest operating system completely encodes and/or decodes the media data in software within the guest operating system (e.g., the encoding and/or decoding is implemented without using hardware functionality). Encoding and/or decoding media data in software within the guest operating system can be inefficient. For instance, without an interface to hardware functionality, the software limited encoding and/or decoding uses a large amount of bandwidth of the central processing unit (CPU) of the host machine (e.g., when processing 4 k video for display).

In contrast, the performance of the encoding and/or decoding can be greatly improved with the interface to hardware functionality such as hardware-accelerated encoding and/or decoding. One specific example of the interface to hardware functionality is DirectX Video Acceleration (DXVA), which is an application programming interface (API) specification that allows the encoding and/or decoding of video to be hardware-accelerated. More specifically, DXVA allows certain CPU-intensive operations, such as inverse discrete cosine transform (iDCT), motion compensation, and/or deinterlacing, to be offloaded to the graphic processing unit (GPU). A GPU is an electronic circuit designed to manipulate and alter memory to accelerate the creation of images in a frame buffer intended for output to a display device. The GPU may be configured in a graphics card.

In another example, the operation related to the processing of the media data is encrypting and/or decrypting the media data. The encrypting and/or decrypting of the media data can be performed by an encryption and/or decryption component. Similar to the discussion above, the performance of the encrypting and/or decrypting can be greatly improved with an interface to hardware functionality (e.g., the GPU, a cryptographic processor).

In yet another example, the operation related to the processing of the media data is enforcement of Digital Rights Management (DRM). Accordingly, the media processing component can be a DRM component. DRM provides content providers with means to protect their proprietary media data from unauthorized copying and/or illegal uses. DRM technology encrypts the media data and attaches the encrypted media data to rules that define conditions under which a user and/or an operating system can output the media data. In one example, the rules limit a number of times a song can be played. In another example, the rules limit a number of times a video clip can be viewed.

A DRM component configured on the host operating system is more performant than a corresponding, but different, DRM component configured on the guest operating system because the host DRM component includes a trusted execution environment. A trusted execution environment is configured to provide a secure area of the host machine's CPU and is configured to implement higher DRM protection and/or enforcement levels for content compared to the DRM component configured on the guest operating system.

Given the examples of a media processing component above, the system described herein determines if the media processing component configured on the host operating system is more performant than a corresponding, but different type of, media processing component configured on the guest operating system. Alternatively, the system may determine if the host operating system is configured with a media processing component that is not configured on the guest operating system at all. If the media processing component configured on the host operating system is more performant than the corresponding, but different type of, media processing component configured on the guest operating system, or if the host operating system is configured with a media processing component that is not configured on the guest operating system at all, the guest operating system provides, via an API, a request to create an instance of the media processing component (e.g., a codec, an encryption/decryption component, a DRM component) configured on the host operating system.

In association with the request, the guest operating system allocates space in CPU memory for media data that is to be processed by the instance of the media processing component configured on the host operating system. The CPU memory is shared between the host operating system and the guest operating system. This media data may be referred to as "input" media data. The guest operating system stores the input media data in the allocated CPU memory. Furthermore, the guest operating system provides, via the API, reference(s) to locations of the allocated CPU memory (e.g., memory addresses). The reference(s) to the locations of the allocated CPU memory enable the host operating system to retrieve the input media data and process the input media data using the instance of the media processing component configured on the host operating system.

Accordingly, the host operating system is configured to generate "output" media data (e.g., decoded media data, decrypted media data, DRM enforced media data). Upon completion of the processing of the input media data using the instance of the media processing component configured on the host operating system, the host operating system provides an indication, to the guest operating system, that the input media data has been processed using the instance of the media processing component configured on the host operating system and that the processed media data is ready to be rendered for output (e.g., video data for display, audio data for output via a speaker, encoded and/or encrypted data for network transmission).

In the context of video display, the host operating system does not pass the actual processed media data back to the guest operating system because the media rendering (e.g., color conversion from YUV color space to the RGB color space) is performed via host components (e.g., the CPU and/or the GPU). Instead, the host operating system renders the processed media data directly to a color space defined by the guest operating system. By not passing the actual processed media data back to the guest operating system, the overall performance of the host machine is improved because an output video frame does not need to be copied from GPU memory to the shared CPU memory, and then copied back to the GPU memory for rendering. Rather, the output video frame can be passed directly to the GPU memory for rendering.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
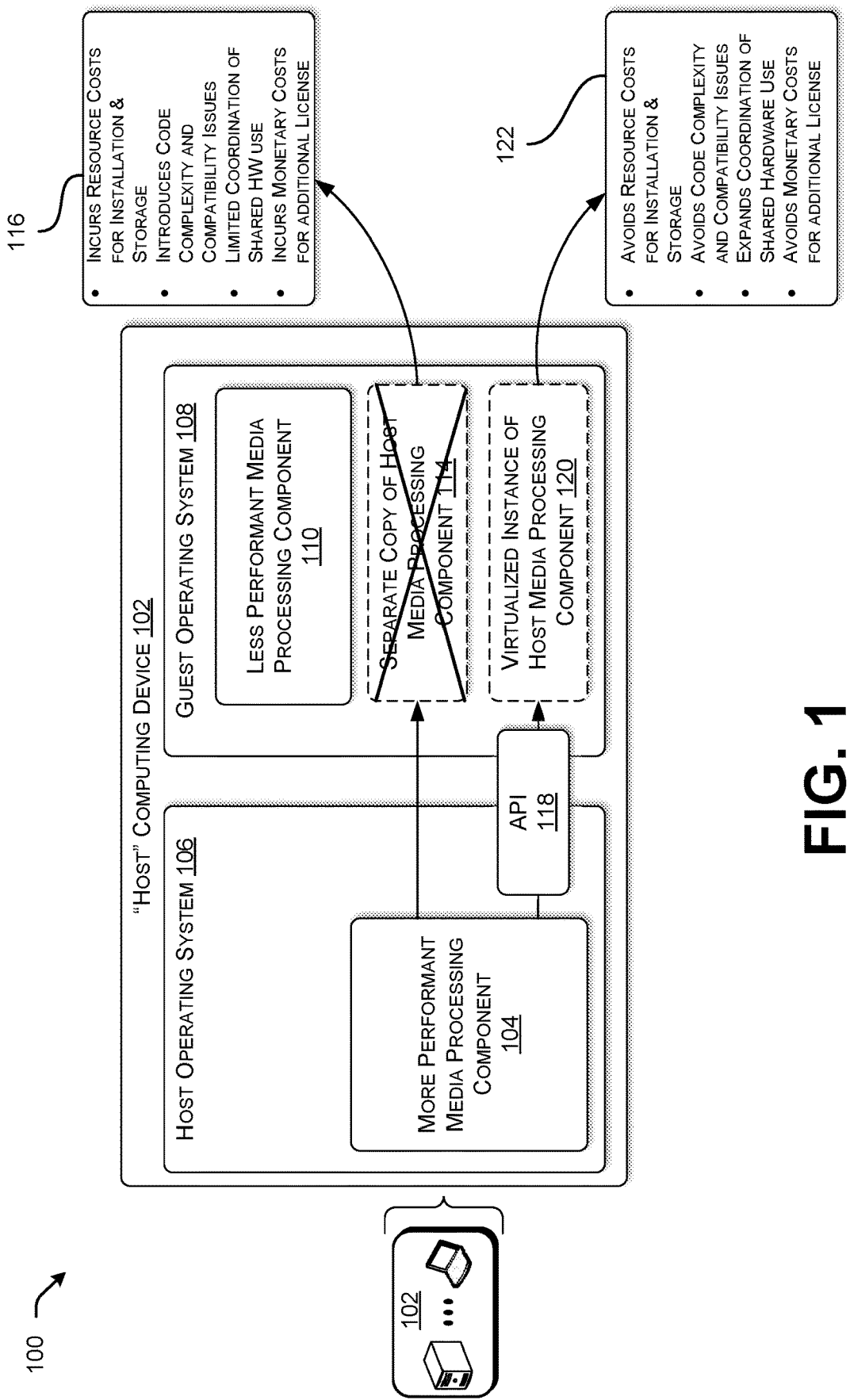
FIG. 1 illustrates an example environment where access to, and use of, a media processing component on a host operating system is provisioned to a guest operating system.

The techniques described herein enable a guest operating system to access and use a media processing component configured on a host operating system. It can be beneficial for the guest operating system to access and use the media processing component configured on the host operating system when the media processing component configured on the host operating system is more performant than a corresponding, but different type of, media processing component configured on the guest operating system. Alternatively, it can be beneficial for the guest operating system to access and use the media processing component configured on the host operating system when the guest operating system does not have its own corresponding, but different type of, media processing component.

To account for a difference in performance between a host media processing component and a guest media processing component, the host operating system could provision a copy of its more performant media processing component to the guest operating system. Unfortunately, provisioning a copy of a more performant media processing component to the guest operating system results in some issues that are difficult to address. For example, such provisioning would increase the resource cost (e.g., central processing unit (CPU) cycles, memory footprint) due to the installation and storage requirements for the copy of the more performant media processing component. In another example, such provisioning would introduce some code complexity issues, because the high-level media processing code in the guest operating system is likely incompatible with the low-level media processing code in the more performant media processing component, which is configured to interact with the hardware resources (e.g., a graphics processing unit (GPU)) of the host machine. In yet another example, a separate license may be required for the copy of the more performant media processing component, which would increase the monetary cost of executing the host operating system, and by association, executing the guest operating system. Finally, such provisioning would limit the ability for the host operating system to coordinate and schedule the shared use of host hardware components for multiple guest operating systems executing via the host computing device.

By using the media processing components on the host operating system, the performance related to the output of media data is improved. For example, resources (e.g., CPU cycles, memory) do not have to be expended to install and store a separate copy of the host media processing component on the guest operating system, thereby reducing the overall resource cost. In another example, the high-level media processing code on the guest operating system does not have to be altered or updated for compatibility with the low-level processing code in the host media processing component that is configured to interact with hardware resources of the host machine. Furthermore, the need for additional license(s) for a separate copy of the host media processing component on the guest operating system is eliminated. Finally, coordination and scheduling the shared use of host hardware components for multiple guest operating systems executing via the host computing device can be better managed.

Various examples, scenarios, and aspects that enable the techniques described herein are described below with respect to FIGS. 1-7.

FIG. 1 illustrates an example environment 100 in which a "host" computing device 102 (e.g., a "host" machine such as a desktop device, a server device, a laptop device, a tablet device, a smartphone device) provisions access to, and use of, a media processing component 104 of a host operating system 106 to a guest operating system 108. As described above, the media processing component 104 of the host operating system 106 is more performant compared to a corresponding, but different type of, media processing component 110 configured on the guest operating system 108. Consequently, FIG. 1 labels the illustrated media processing components as a "more performant" media processing component 104 on the host and a "less performant" media processing component 110 on the guest.

One solution to address the difference in performance between the more performant media processing component 104 and the less performant media processing component 110 is for the host operating system 106 to provision a separate copy 114 of its more performant media processing component 104 to the guest operating system 108. This would enable the guest operating system 108 to execute the more performant media processing component 104 itself. Unfortunately, provisioning the separate copy 114 of the more performant media processing component 104 to the guest operating system 108 results in some issues 116 that are difficult to address.

First, provisioning the separate copy 114 of the more performant media processing component 104 to the guest operating system 108 increases the resource cost (e.g., central processing unit cycles, memory footprint) due to the installation and storage requirements for the separate copy 114 of the more performant media processing component 104. Second, provisioning the separate copy 114 of the more performant media processing component 104 to the guest operating system 108 introduces code complexity issues because the high-level media processing code in the guest operating system 108 is likely incompatible with the low-level media processing code in the more performant media processing component 104, which is configured to interact with the hardware resources (e.g., a GPU) of the host computing device 102. Third, provisioning the separate copy 114 of the more performant media processing component 104 to the guest operating system 108 would limit the ability for the host operating system 106 to coordinate and schedule the shared use of host hardware components for multiple guest operating systems executing via the host computing device 102. Finally, additional monetary costs are incurred to obtain another license for the separate copy 114 of the more performant media processing component 104. Consequently, provisioning the separate copy 114 of the more performant media processing component 104 to the guest operating system 108 is not a viable solution (hence the "X" through element 114 in FIG. 1).

Rather than provision the separate copy 114 of its more performant media processing component 104 to the guest operating system 108, the host operating system 106 is configured to provide and implement an application programming interface (API) 118 to enable execution of a virtualized instance of the host media processing component 120. As described herein, the API 118 includes a host proxy and a guest proxy so that it appears that the virtualized instance of the host media processing component 120 performs a media processing operation via the guest operating system 108 when the media processing operation is actually proxied to the more performant media processing component 104 of the host operating system 106 via the API 118.

Consequently, the increased amount of resource use (e.g., CPU cycles, memory footprint) to install and store a separate copy of the more performant media processing component are avoided, code complexity and compatibility issues are not introduced, the expanded ability to coordinate and schedule hardware resource use across multiple guest operating systems is realized, and additional monetary costs to obtain another license are avoided, as captured in item 122.

As described above, a media processing component is software, hardware, firmware, or a combination thereof, that is involved in performing an operation, or function, related to the processing of media data. The processing of the media data enables images and/or audio (e.g., game video, streaming video, photographs, music, podcasts, videoconference session) to be output via a display device and/or an audio output device (e.g., a speaker, ear phones).

Figure 2A:
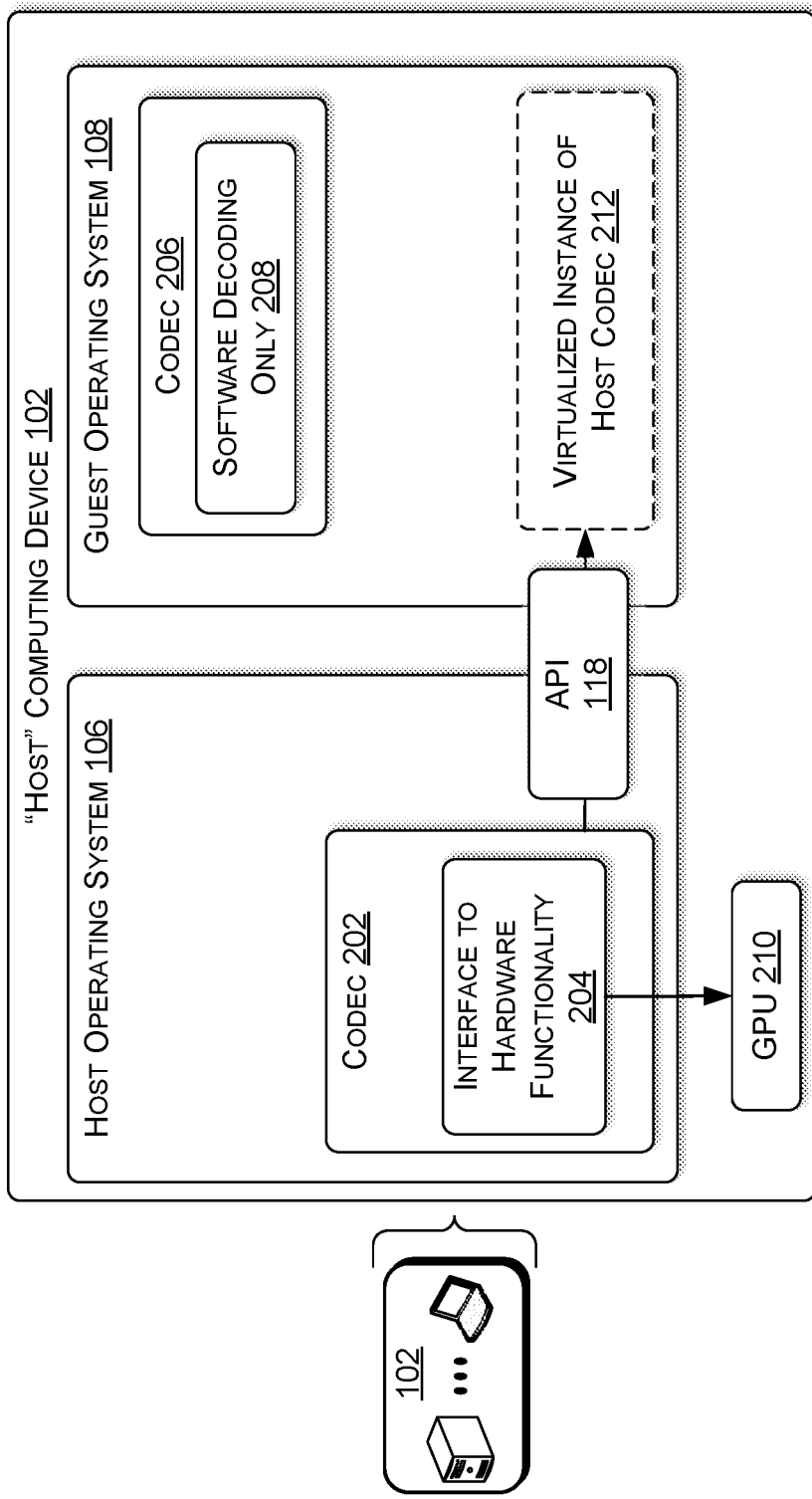
FIG. 2A illustrates the example environment of FIG. 1 where the media processing component is a codec.

In one example, the operation related to the processing of the media data is encoding and/or decoding the media data. FIG. 2A illustrates the example environment of FIG. 1 where the more performant media processing component 104 is a codec 202. The codec 202 includes an encoder that compresses the media data and/or a decoder that decompresses the media data.

Provisioning access to, and use of, the codec 202 of the host operating system 106 is beneficial to the guest operating system 108 when the codec 202 provides an interface to hardware functionality 204, while the codec 206 of the guest operating system 108 completely encodes and/or decodes the media data in software. Stated another way, the codec 206 of the guest operating system 108 uses software encoding and/or decoding only 208, without using hardware functionality.

Encoding and/or decoding media data in software within the guest operating system 108 can be inefficient. For instance, without an interface to hardware functionality, the software-limited encoding and/or decoding uses a large amount of bandwidth of the CPU of the host computing device 102 (e.g., when processing 4 k video for display). In contrast, the performance of the encoding and/or decoding can be greatly improved via the interface to hardware functionality 204 provided by hardware-accelerated encoding and/or decoding. One specific example of the interface to hardware functionality 204 is DirectX Video Acceleration (DXVA), which is an API specification that allows the encoding and/or decoding of video to be hardware-accelerated. More specifically, DXVA allows certain CPU-intensive operations, such as inverse discrete cosine transform (iDCT), motion compensation, and/or deinterlacing, to be offloaded to a GPU 210. Accordingly, a virtualized instance of the host codec 212, enabled via the API 118, can provide performance benefits when the guest operating system 108 is called upon to decode media data for output.

Figure 2B:
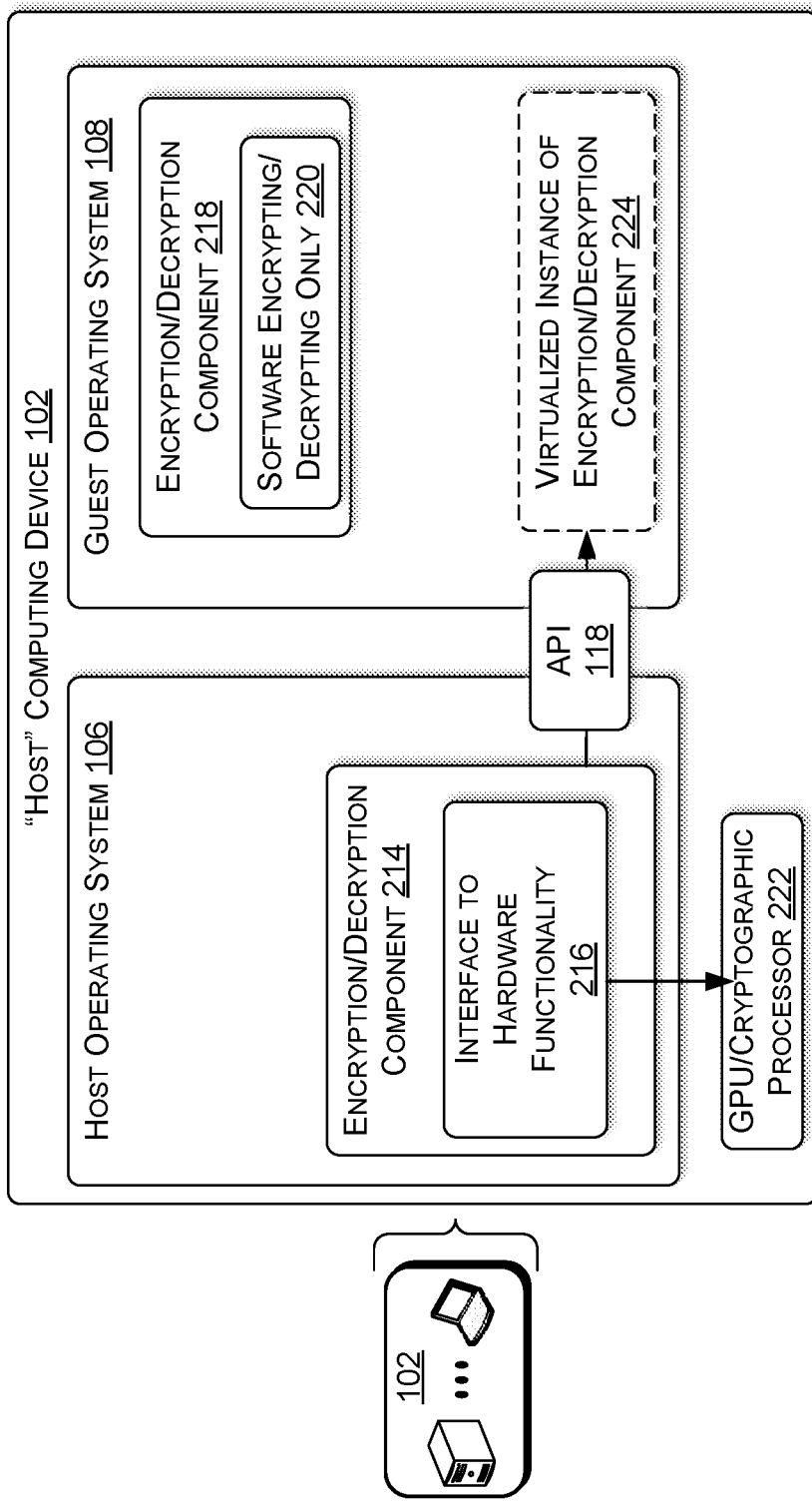
FIG. 2B illustrates the example environment of FIG. 1 where the media processing component is an encryption/decryption component.

In another example, the operation related to the processing of the media data is encrypting and/or decrypting the media data. FIG. 2B illustrates the example environment of FIG. 1 where the more performant media processing component 104 is an encryption/decryption component 214.

Similar to the discussion above with respect to FIG. 2A, provisioning access to, and use of, the encryption/decryption component 214 of the host operating system 106 is beneficial to the guest operating system 108 when the encryption/decryption component 214 provides an interface to hardware functionality 216, while the encryption/decryption component 218 of the guest operating system 108 completely encrypts and/or decrypts the media data in software. Stated another way, the encryption/decryption component 218 of the guest operating system 108 uses software encrypting and/or decrypting only 220, without using hardware functionality.

In one example, the interface to hardware functionality 216 provides access to a more secure and trusted hardware environment for encrypting and decrypting media data via a GPU, cryptographic processor, etc. 222. Accordingly, a virtualized instance of the host encryption/decryption component 224, enabled via the API 118, can provide performance benefits when the guest operating system 108 is called upon to decrypt media data for output.

Figure 2C:
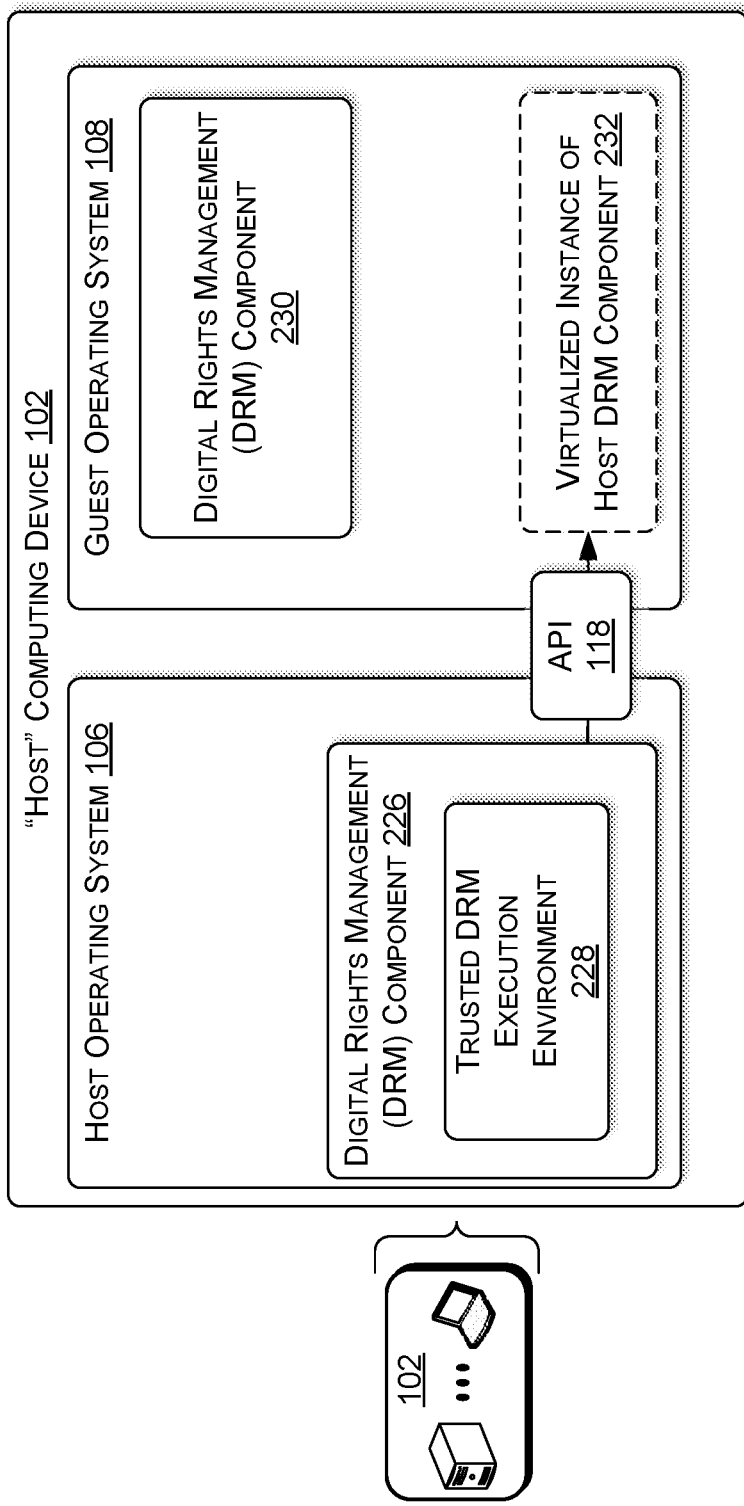
FIG. 2C illustrates the example environment of FIG. 1 where the media processing component is a Digital Rights Management (DRM) component.

In yet another example, the operation related to the processing of the media data is enforcement of Digital Rights Management (DRM). FIG. 2C illustrates the example environment of FIG. 1 where the more performant media processing component 104 is a DRM component 226. DRM provides a means to protect proprietary media data from unauthorized copying and/or illegal uses. DRM technology encrypts the media data and attaches the encrypted media data to rules that define conditions under which a user and/or an operating system can output the media data. In one example, the rules limit a number of times a song can be played. In another example, the rules limit a number of times a video clip can be viewed.

Provisioning access to, and use of, the DRM component 226 of the host operating system 106 is beneficial to the guest operating system 108 when the DRM component 226 has access to a trusted DRM execution environment 228, while the DRM component 230 of the guest operating system 108 does not have access to the trusted DRM execution environment 228.

In one example, the trusted DRM execution environment 228 provides a secure area of the host computing device's CPU and is configured to implement higher DRM protection and/or enforcement levels for content. Accordingly, a virtualized instance of the host DRM component 232, enabled via the API 118, can provide performance benefits when the guest operating system 108 is called upon to enforce DRM for media data being output.

Figure 3:
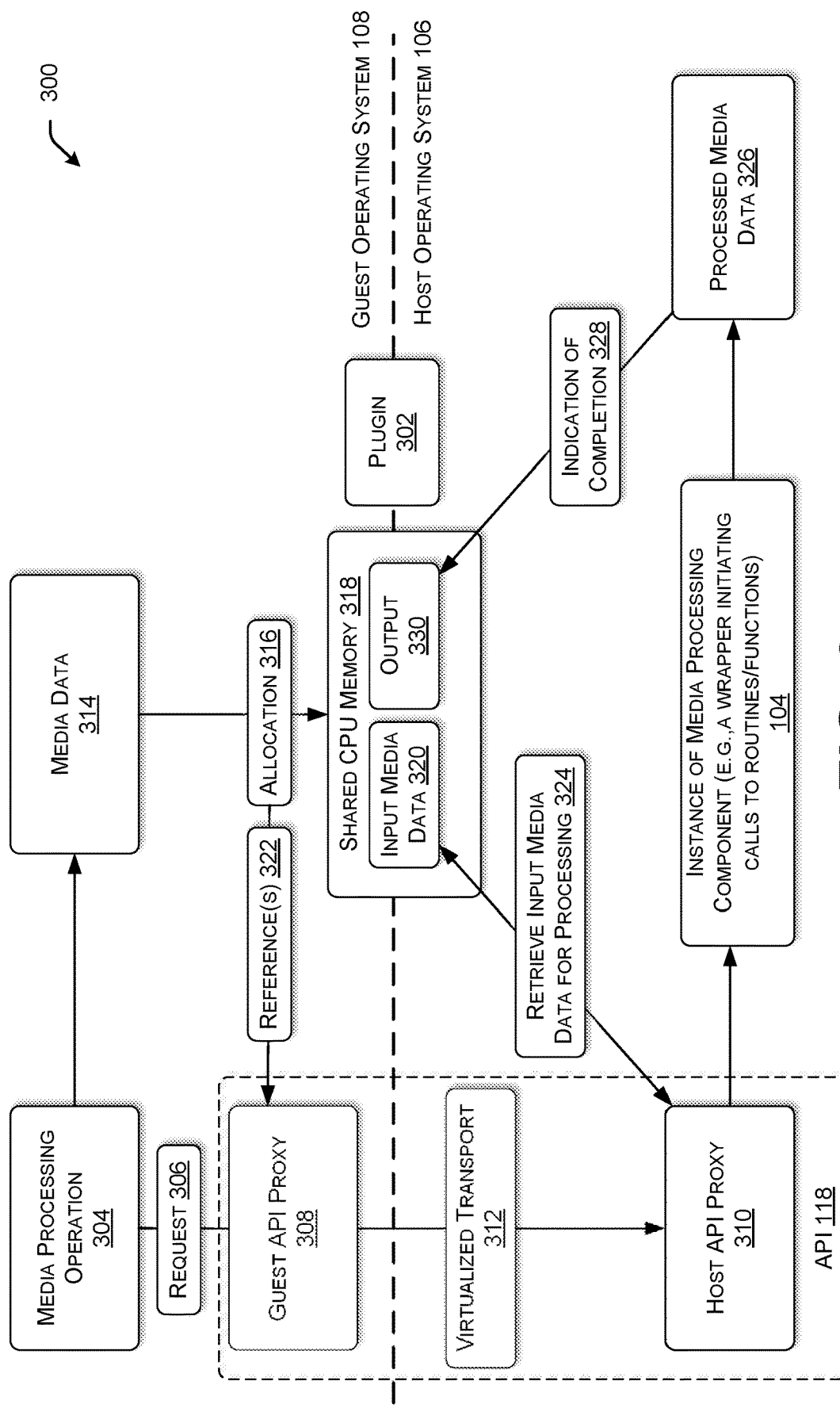
FIG. 3 illustrates a diagram that defines example components and operations that enable host media processing components to be provisioned to a guest operating system in a virtualized manner.

FIG. 3 illustrates a diagram 300 that defines the components and the operations that enable host media processing components to be provisioned to a guest operating system in a virtualized manner. The dashed line in the middle of FIG. 3 separates components configured on, and operations that occur in, the guest operating system 108, from the components configured on, and operations that occur in, the host operating system 106.

The diagram 300 in FIG. 3 may be implemented in response to the guest operating system 108 accessing and loading a plugin 302 (e.g., Open Media Acceleration (OMX) plugin) configured to instantiate the host media processing components. The plugin 302 provides abstractions for processing of media data (e.g., audio, video, still images) using host media processing components.

At a time after the plugin 302 is loaded, the guest operating system 108 is instructed to perform a media processing operation 304. For example, a media application executing via the guest operating system 108 may request the display of video and the guest operating system 108 is configured to identify the media processing operation 304 that needs to be performed (e.g., decoding, decrypting, DRM enforcement, etc.) so the video can be displayed. In another example, a media application executing via the guest operating system 108 may request the transmission of media data (e.g., for remote display via High-bandwidth Digital Content Protection (HDCP) 2.2 network protocols, Miracast, or CHROMECAST), and thus, the media data needs to be encoded and/or encrypted.

When the guest operating system 108 is instructed to perform the media processing operation 304, the guest operating system 108 issues or sends a request 306 to the host operating system 106 via the API 118 (as illustrated in FIG. 1 and FIGS. 2A-2C). More details for the API 118 are illustrated in FIG. 3. Specifically, the API 118 includes a guest API proxy 308 (e.g., installed via the loading of the plugin 302) and a host API proxy 310. The guest API proxy 308 and the host API proxy 310 are configured to enable a virtualized transport 312 of media processing operations so that media data 314 is processed via the host operating system 106 while maintaining the appearance that the media data 314 is processed via the guest operating system 108.

To do this, the guest operating system 108 identifies the media data 314 associated with the media processing operation 304. For example, the media data 314 is encoded media data for a single video frame or a group of video frames. In association with the request 306, the guest operating system 108 provides an allocation 316 in shared CPU memory 318. The CPU memory 318 is referred to as "shared" CPU memory 318 because it is shared between the host operating system 106 and the guest operating system 108.

The allocation 316 defines space in the shared CPU memory 318 for the media data 314, and thus, the guest operating system 108 stores the media data 314 to the allocated space in the shared CPU memory 318. FIG. 3 illustrates the stored media data 314 as input media data 320.

In association with the allocation 316, the guest operating system 108 provides reference(s) 322 (e.g., memory block addresses) to the host operating system 106 via the guest API proxy 308 and the virtualized transport 312. Accordingly, the host API proxy 310 has now received the request 306 to perform the media processing operation 304, as well as the reference(s) 322 associated with allocation 316 of memory space in the shared CPU memory 318 for the input media data 320. Note the guest operating system 108 can issue a request, allocate memory, and pass references on a per-frame basis (e.g., for each video frame). Alternatively, the guest operating system 108 can issue a request, allocate memory, and pass references for a group of frames (e.g., a sequence of dependent video frames).

With the passed reference(s) 322, the host API proxy 310 knows where the input media data 320 is stored and, thus, uses the reference(s) 322 to retrieve the input media data 320 for processing, as illustrated by item 324. The host API proxy 310 then passes the retrieved input media data 320 to the instance of the media processing component 104 (e.g., a codec, an encryption/decryption component, a DRM component) so the media processing operation 304 can be performed and the processed media data 326 is generated.

In one example, the host operating system 106 creates the instance of the media processing component 104 by a wrapper (e.g., a dynamic link library (dll) wrapper) placed around a media processing pipeline (e.g., the WINDOWS Media Foundation pipeline). In some embodiments, the wrapper contains the codec, the encryption/decryption component, the DRM component, and/or other media processing components configured to render video data for display. For example, the processed media data 326 may be generated in a YUV color space and a color conversion component in the media processing pipeline converts the processed media data 326 from the YUV color space to the RGB color space to be rendered on screen.

An indication of completion 328 is provided as an output/result 330 to the shared CPU memory 318 (e.g., a result block defined in the allocation 316). The host operating system 106 does not pass the actual processed media data 326 back to the guest operating system 108 because the media rendering (e.g., color conversion from YUV color space to the RGB color space) and/or network transmission is performed via host components (e.g., the CPU, the GPU, the network interface card (NIC)).

For example, the host operating system 106 renders the processed media data 326 directly to a color space defined by the guest operating system 108. By not passing the actual processed media data 326 back to the guest operating system 108, the overall performance of the host computing device 102 is improved because an output video frame does not need to be copied from GPU memory to the shared CPU memory 318, and then copied back to the GPU memory for rendering. Rather, the output video frame can be passed directly to the GPU memory for rendering and/or can be displayed based on instructions issued from the guest operating system 108.

Figure 4:
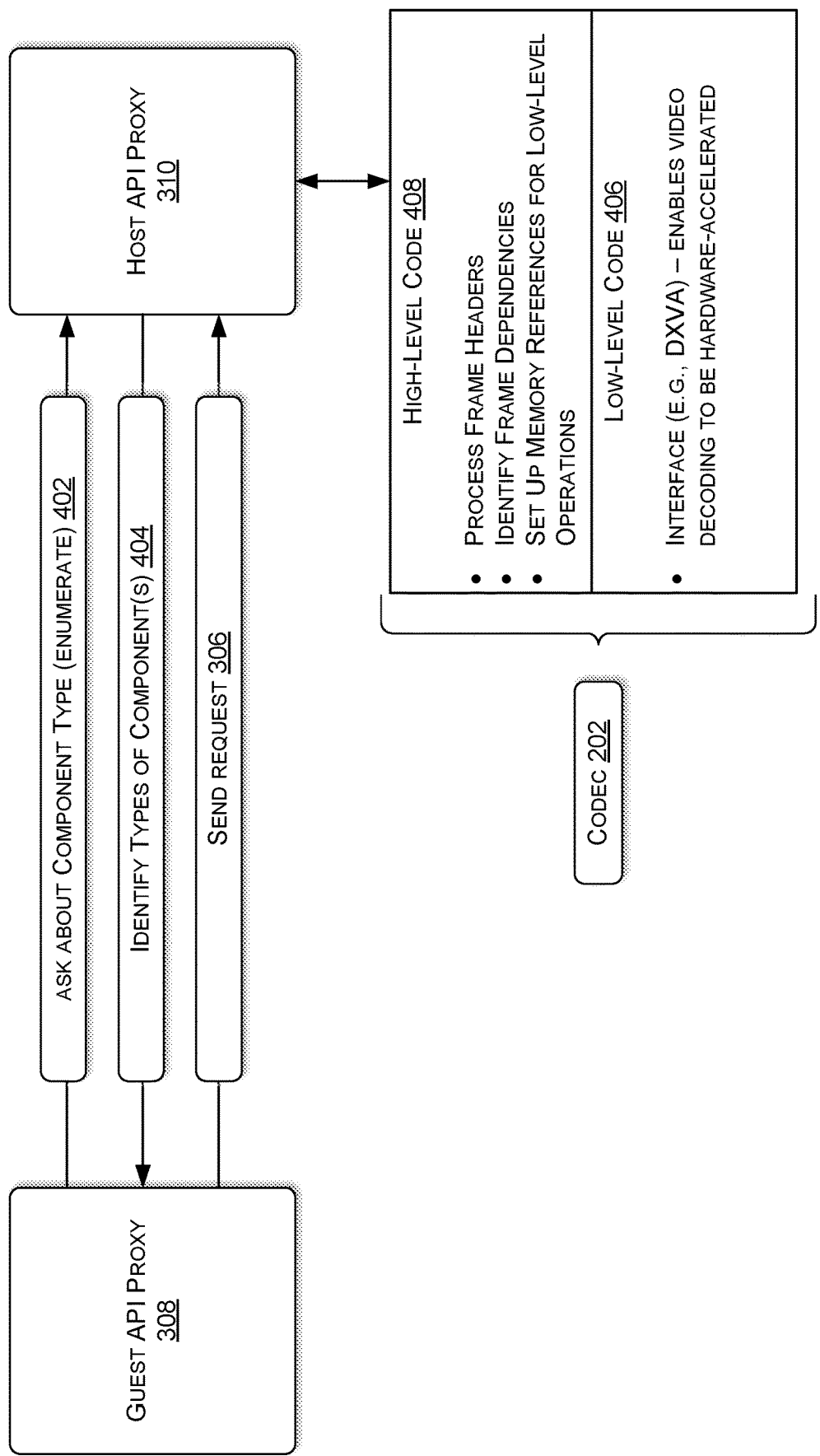
FIG. 4 illustrates a diagram that captures an example exchange between a guest API proxy and a host API proxy to determine whether the guest operating system has access to, and use of, a media processing component on a host operating system.

In one example, the media processing operations implemented by the guest operating system are configured to always be proxied to and executed via the host operating system. In another example, the guest operating system can decide whether to call on the host operating system to implement the media processing operations. FIG. 4 illustrates a diagram that captures an example exchange between the guest API proxy 308 and the host API proxy 310 to determine whether access to, and use of, the media processing component 104 on the host operating system 106 is beneficial to the guest operating system 108. As shown, after loading the plugin 302, the guest API proxy 308 performs an enumeration operation 402 that asks the host API proxy 310 about the type(s) of media processing components on the host operating system 106. The host API proxy 310 then responds by identifying the types of media processing component(s) 404.

Using the codec 202 as an example, the host API proxy 310 indicates a codec that includes low-level code 406 that provides an interface (e.g., DXVA) to hardware functionality that enables video decoding to be hardware-accelerated, as well as high-level code 408 that processes frame headers, identifies frame dependencies, and sets up the memory reference(s) 322 for low-level operations. Examples of such codecs include H.264 or H.265.

The guest API proxy 308 passes the identified component(s) to the guest operating system 108 so the guest operating system 108 can determine whether media processing performance can be improved using the host media processing components. If performance can be improved, the guest operating system 108 sends the request 306.

Figure 5:
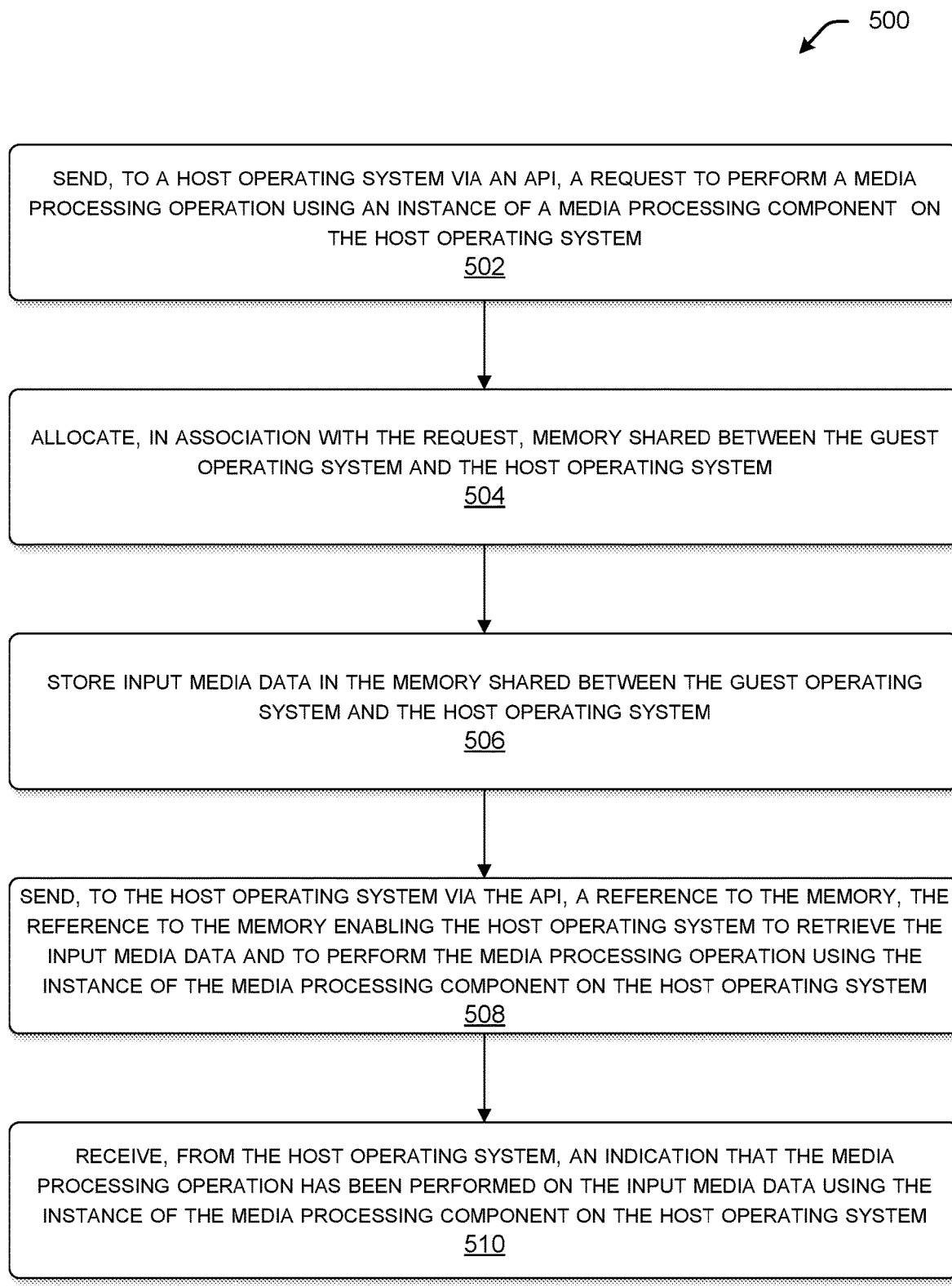
FIG. 5 is an example flow diagram showing aspects of a routine implemented by the guest operating system to enable access to, and use of, a media processing component on a host operating system.

Turning now to FIG. 5, aspects of a method 500 implemented by the guest operating system to enable access to, and use of, a media processing component on a host operating system are shown and described. The method 500 beings at operation 502 where the guest operating system sends, to a host operating system via an API, a request to perform a media processing operation using an instance of a media processing component configured on the host operating system. At operation 504, the guest operating system allocates, in association with the request, memory shared between the guest operating system and the host operating system. The memory is allocated for input media data on which the media processing operation is to be performed using the instance of the media processing component configured on the host operating system.

At operation 506, the guest operating system stores the input media data in the memory shared between the guest operating system and the host operating system. Then, at operation 508, the guest operating system sends, to the host operating system via the API, a reference to the memory. The reference to the memory enables the host operating system to retrieve the input media data and to perform the media processing operation on the input media data using the instance of the media processing component configured on the host operating system.

At operation 510, the guest operating system receives, from the host operating system, an indication that the media processing operation has been performed on the input media data using the instance of the media processing component configured on the host operating system, the performance of the media processing operation producing processed media data.

Figure 6:
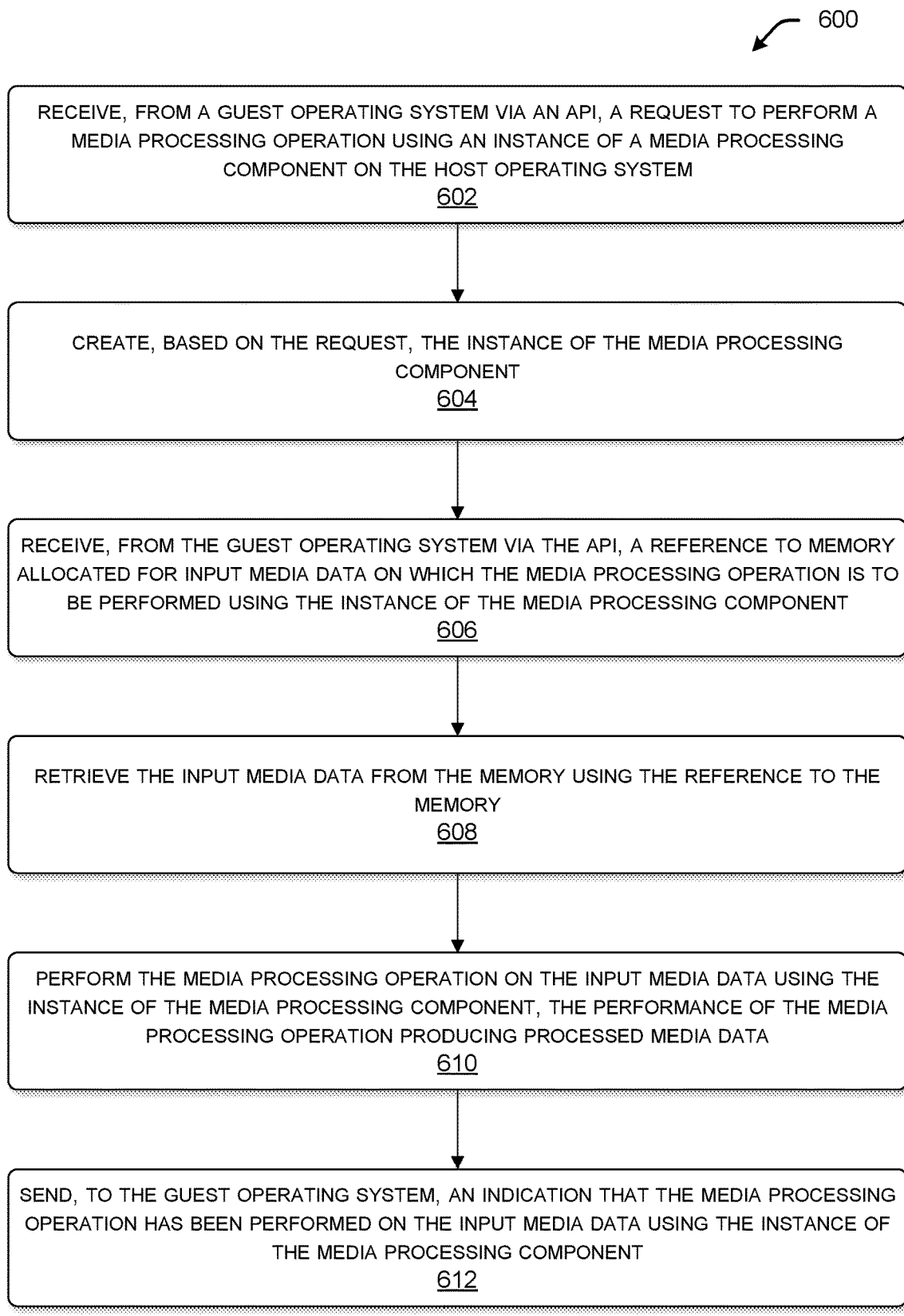
FIG. 6 is an example flow diagram showing aspects of a routine implemented by the host operating system to enable access to, and use of, a media processing component on a host operating system for a guest operating system.

Turning now to FIG. 6, aspects of a method 600 implemented by a host operating system to enable access to, and use of, a media processing component on the host operating system for a guest operating system. The method begins at operation 602 where the host operating system receives, from a guest operating system via an API, a request to perform a media processing operation using an instance of a media processing component configured on the host operating system. At operation 604, the host operating system creates, based on the request, the instance of the media processing component.

At operation 606, the host operating system receives, from the guest operating system via the API, a reference to memory allocated for input media data on which the media processing operation is to be performed using the instance of the media processing component. The memory is shared between the guest operating system and the host operating system.

At operation 608, the host operating system retrieves the input media data from the memory using the reference to the memory. Then at operation 610, the host operating system performs the media processing operation on the input media data using the instance of the media processing component, the performance of the media processing operation producing processed media data.

At operation 612, the host OS sends, to the guest operating system, an indication that the media processing operation has been performed on the input media data using the instance of the media processing component.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Figure 7:
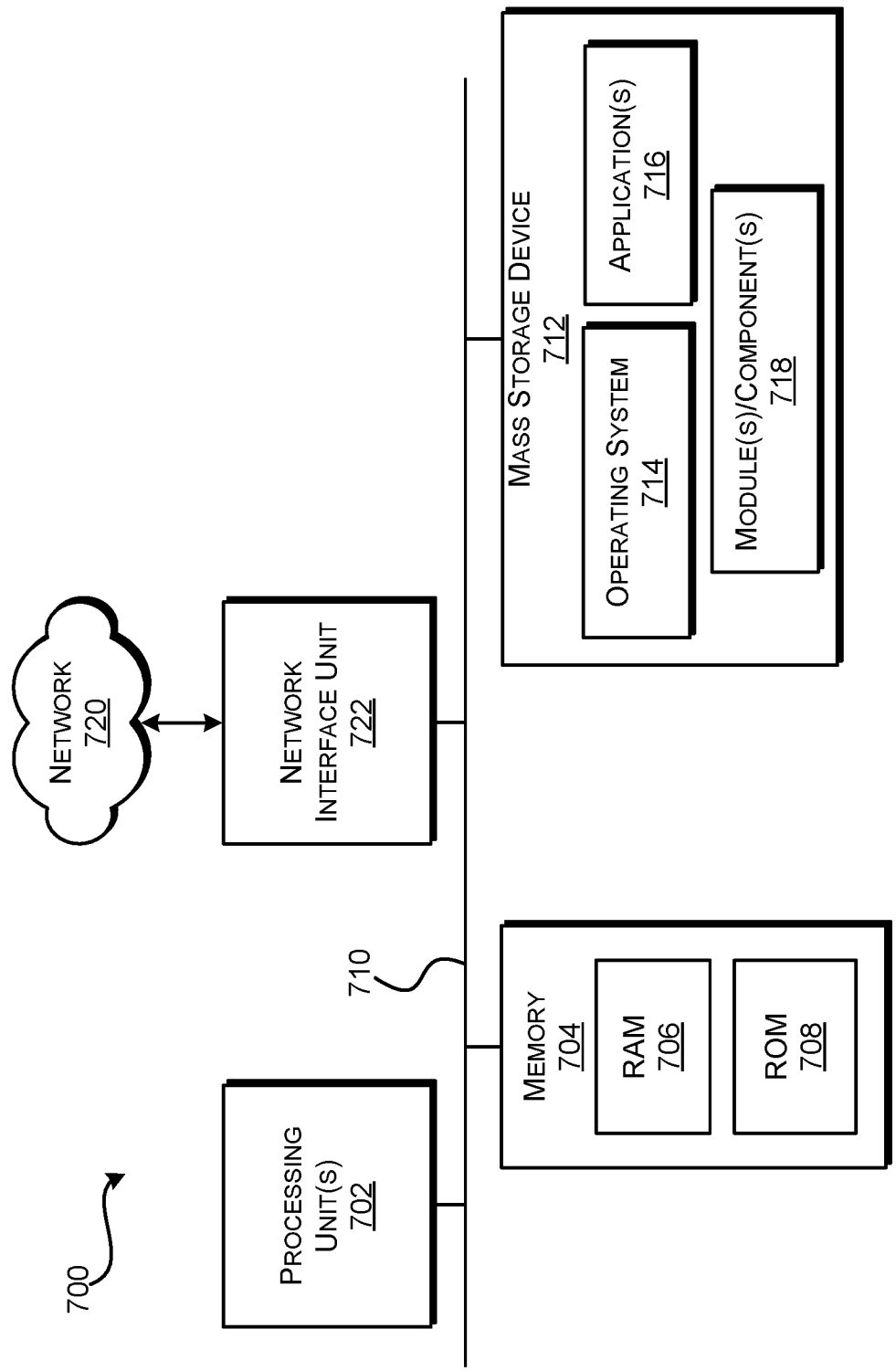
FIG. 7 is a computer architecture diagram showing an illustrative computer hardware and software architecture for a computing system capable of implementing aspects of the techniques and technologies presented herein.

FIG. 7 shows additional details of an example computer architecture 700 for a device, such as a computer or a server capable of executing computer instructions (e.g., a component described herein). The computer architecture 700 illustrated in FIG. 7 includes processing system including processing unit(s) 702, a system memory 704, including a random-access memory 706 (RAM) and a read-only memory (ROM) 708, and a system bus 710 that couples the memory 704 to the processing unit(s) 702. In various examples, the processing units 702 of the processing system are distributed. Stated another way, one processing unit 702 of the processing system may be located in a first location (e.g., a rack within a datacenter) while another processing unit 702 of the processing system is located in a second location separate from the first location.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit (s) 702.

The disclosure presented herein also encompasses the subject matter set forth in the following clauses.

Example Clause A, a method implemented by a host operating system comprising: receiving, from a guest operating system via an application programming interface, a request to perform a media processing operation using an instance of a media processing component configured on the host operating system; receiving, from the guest operating system via the application programming interface, a reference to memory allocated for input media data on which the media processing operation is to be performed using the instance of the media processing component, wherein the memory is shared between the guest operating system and the host operating system; retrieving the input media data from the memory using the reference to the memory; producing processed media data by performing the media processing operation on the input media data using the instance of the media processing component; and sending, to the guest operating system, an indication that the media processing operation has been performed on the input media data.

Example Clause B, the method of Example Clause A, wherein the media processing component configured on the host operating system implements hardware functionality that is unavailable to a corresponding media processing component configured on the guest operating system.

Example Clause C, the method of Example Clause B, wherein: the media processing component configured on the host operating system comprises a first type of codec; the corresponding media processing component configured on the guest operating system comprises a second type of codec that is different than the first type of codec; and the media processing operation comprises encoding or decoding the input media data.

Example Clause D, the method of Example Clause C, wherein the hardware functionality is implemented via hardware-accelerated encoding or decoding.

Example Clause E, the method of Example Clause B, wherein: the media processing component configured on the host operating system comprises a first type of encryption/decryption component; the corresponding media processing component configured on the guest operating system comprises a second type of encryption/decryption component that is different than the first type of encryption/decryption component; and the media processing operation comprises encrypting or decrypting the input media data.

Example Clause F, the method of Example Clause A, wherein: the media processing component configured on the host operating system comprises a first type of Digital Rights Management component; a corresponding media processing component configured on the guest operating system comprises a second type of Digital Rights Management component that is different than the first type of Digital Rights Management component; and the media processing operation comprises Digital Rights Management enforcement.

Example Clause G, the method of any one of Example Clauses A through F, wherein the input media data comprises a frame of a video and the host operating system is configured to receive the request on a per-frame basis.

Example Clause H, the method of any one of Example Clauses A through G, further comprising: receiving a target color space for display from the guest operating system; converting the processed media data from a current color space to the target color space; and in response to the converting, rendering the processed media data for display in the target color space.

Example Clause I, the method of any one of Example Clauses A through H, further comprising creating, based on the request, the instance of the media processing component.

Example Clause J, a method implemented by a guest operating system comprising: sending, to a host operating system via an application programming interface, a request to perform a media processing operation using an instance of a media processing component configured on the host operating system; storing input media data in memory shared between the guest operating system and the host operating system; sending, to the host operating system via the application programming interface, a reference to the memory, the reference to the memory enabling the host operating system to retrieve the input media data and to perform the media processing operation on the input media data using the instance of the media processing component configured on the host operating system; and receiving, from the host operating system, an indication that the media processing operation has been performed on the input media data.

Example Clause K, the method of Example Clause J, further comprising allocating, in association with the request, the memory shared between the guest operating system and the host operating system.

Example Clause L, the method of Example Clause J or Example Clause K, wherein the media processing component configured on the host operating system implements hardware functionality that is unavailable to a corresponding media processing component configured on the guest operating system.

Example Clause M, the method of Example Clause L, wherein: the media processing component configured on the host operating system comprises a first type of codec; the corresponding media processing component configured on the guest operating system comprises a second type of codec that is different than the first type of codec; and the media processing operation comprises encoding or decoding the input media data.

Example Clause N, the method of Example Clause M, wherein the hardware functionality is implemented via hardware-accelerated encoding or decoding.

Example Clause O, the method of Example Clause L, wherein: the media processing component configured on the host operating system comprises a first type of encryption/decryption component; the corresponding media processing component configured on the guest operating system comprises a second type of encryption/decryption component that is different than the first type of encryption/decryption component; and the media processing operation comprises encrypting or decrypting the input media data.

Example Clause P, the method of Example Clause J, wherein: the media processing component configured on the host operating system comprises a first type of Digital Rights Management component; a corresponding media processing component configured on the guest operating system comprises a second type of Digital Rights Management component that is different than the first type of Digital Rights Management component; and the media processing operation comprises Digital Rights Management enforcement.

Example Clause Q, the method of any one of Examples Clause J through P, wherein the input media data comprises a frame of a video and the guest operating system is configured to provide the request on a per-frame basis.

Example Clause R, the method of any one of Examples Clause J through Q, further comprising: loading a plugin to create the application programming interface; and performing an enumeration operation, via the plugin, to identify a type of the media processing component configured on the host operating system.

Example Clause S, a device comprising: a processing system; and computer-readable storage media storing a host operating system that, when executed by the processing system, cause the device to: receive, from a guest operating system via an application programming interface, a request to perform a media processing operation using an instance of a media processing component configured on the host operating system; receive, from the guest operating system via the application programming interface, a reference to memory allocated for input media data on which the media processing operation is to be performed using the instance of the media processing component, wherein the memory is shared between the guest operating system and the host operating system; retrieve the input media data from the memory using the reference to the memory; produce processed media data by performing the media processing operation on the input media data using the instance of the media processing component; and send, to the guest operating system, an indication that the media processing operation has been performed on the input media data.

Example Clause T, the device of Example Clause S, wherein the media processing component configured on the host operating system implements hardware functionality that is unavailable to a corresponding media processing component configured on the guest operating system.

While certain example embodiments have been described, these embodiments have been presented by way of example only, and are not intended to limit the scope of the inventions disclosed herein. Thus, nothing in the foregoing description is intended to imply that any particular feature, characteristic, step, component, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different components)

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method implemented by a host operating system comprising:
   receiving, from a guest operating system via an application programming interface, a request to perform a media processing operation using an instance of a media processing component configured on the host operating system;
   receiving, from the guest operating system via the application programming interface, a reference to memory allocated for input media data on which the media processing operation is to be performed using the instance of the media processing component, wherein the memory is shared between the guest operating system and the host operating system;
   retrieving the input media data from the memory using the reference to the memory;
   producing processed media data by performing the media processing operation on the input media data using the instance of the media processing component; and
   sending, to the guest operating system, an indication that the media processing operation has been performed on the input media data.

2. The method of claim 1, wherein the media processing component configured on the host operating system implements hardware functionality that is unavailable to a corresponding media processing component configured on the guest operating system.

3. The method of claim 2, wherein:
   the media processing component configured on the host operating system comprises a first type of codec;
   the corresponding media processing component configured on the guest operating system comprises a second type of codec that is different than the first type of codec; and
   the media processing operation comprises encoding or decoding the input media data.

4. The method of claim 3, wherein the hardware functionality is implemented via hardware-accelerated encoding or decoding.

5. The method of claim 2, wherein:
the media processing component configured on the host operating system comprises a first type of encryption/decryption component;
the corresponding media processing component configured on the guest operating system comprises a second type of encryption/decryption component that is different than the first type of encryption/decryption component; and
the media processing operation comprises encrypting or decrypting the input media data.

6. The method of claim 1, wherein:
the media processing component configured on the host operating system comprises a first type of Digital Rights Management component;
a corresponding media processing component configured on the guest operating system comprises a second type of Digital Rights Management component that is different than the first type of Digital Rights Management component; and
the media processing operation comprises Digital Rights Management enforcement.

7. The method of claim 1, wherein the input media data comprises a frame of a video and the host operating system is configured to receive the request on a per-frame basis.

8. The method of claim 1, further comprising:
receiving a target color space for display from the guest operating system;
converting the processed media data from a current color space to the target color space; and
in response to the converting, rendering the processed media data for display in the target color space.

9. The method of claim 1, further comprising creating, based on the request, the instance of the media processing component.

10. A method implemented by a guest operating system comprising:
sending, to a host operating system via an application programming interface, a request to perform a media processing operation using an instance of a media processing component configured on the host operating system;
storing input media data in memory shared between the guest operating system and the host operating system;
sending, to the host operating system via the application programming interface, a reference to the memory, the reference to the memory enabling the host operating system to retrieve the input media data and to perform the media processing operation on the input media data using the instance of the media processing component configured on the host operating system; and
receiving, from the host operating system, an indication that the media processing operation has been performed on the input media data.

11. The method of claim 10, further comprising allocating, in association with the request, the memory shared between the guest operating system and the host operating system.

12. The method of claim 10, wherein the media processing component configured on the host operating system implements hardware functionality that is unavailable to a corresponding media processing component configured on the guest operating system.

13. The method of claim 12, wherein:
the media processing component configured on the host operating system comprises a first type of codec;
the corresponding media processing component configured on the guest operating system comprises a second type of codec that is different than the first type of codec; and
the media processing operation comprises encoding or decoding the input media data.

14. The method of claim 13, wherein the hardware functionality is implemented via hardware-accelerated encoding or decoding.

15. The method of claim 12, wherein:
the media processing component configured on the host operating system comprises a first type of encryption/decryption component;
the corresponding media processing component configured on the guest operating system comprises a second type of encryption/decryption component that is different than the first type of encryption/decryption component; and
the media processing operation comprises encrypting or decrypting the input media data.

16. The method of claim 10, wherein:
the media processing component configured on the host operating system comprises a first type of Digital Rights Management component;
a corresponding media processing component configured on the guest operating system comprises a second type of Digital Rights Management component that is different than the first type of Digital Rights Management component; and
the media processing operation comprises Digital Rights Management enforcement.

17. The method of claim 10, wherein the input media data comprises a frame of a video and the guest operating system is configured to provide the request on a per-frame basis.

18. The method of claim 10, further comprising:
loading a plugin to create the application programming interface; and
performing an enumeration operation, via the plugin, to identify a type of the media processing component configured on the host operating system.

19. A device comprising:
a processing system; and
computer-readable storage media storing a host operating system that, when executed by the processing system, cause the device to:
receive, from a guest operating system via an application programming interface, a request to perform a media processing operation using an instance of a media processing component configured on the host operating system;
receive, from the guest operating system via the application programming interface, a reference to memory allocated for input media data on which the media processing operation is to be performed using the instance of the media processing component, wherein the memory is shared between the guest operating system and the host operating system;
retrieve the input media data from the memory using the reference to the memory;
produce processed media data by performing the media processing operation on the input media data using the instance of the media processing component; and
send, to the guest operating system, an indication that the media processing operation has been performed on the input media data.

20. The device of claim 19, wherein the media processing component configured on the host operating system implements hardware functionality that is unavailable to a corresponding media processing component configured on the guest operating system.

* * * * *